United States Patent [19]

Maccianti et al.

[11] Patent Number: 4,661,925
[45] Date of Patent: Apr. 28, 1987

[54] COMPUTER CONTROL MEMORY APPARATUS PROVIDING VARIABLE MICROINSTRUCTION LENGTH

[75] Inventors: Tiziano Maccianti, Pregnana Milanese; Flavio Balasini, Cornaredo, both of Italy

[73] Assignee: Honeywell Information System Italia, Milan, Italy

[21] Appl. No.: 550,270

[22] Filed: Nov. 9, 1983

[30] Foreign Application Priority Data

Nov. 24, 1982 [IT] Italy .............................. 24400 A/82

[51] Int. Cl.⁴ .......................... G06F 9/22; G06F 9/46
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,859,636 | 1/1975 | Cook | 364/200 |
| 4,070,703 | 1/1978 | Negi | 364/200 |
| 4,109,310 | 8/1978 | England et al. | 364/200 |
| 4,168,523 | 9/1979 | Chari et al. | 364/200 |
| 4,179,731 | 12/1979 | Yamazaki | 364/200 |
| 4,251,862 | 2/1981 | Murayama et al. | 364/200 |
| 4,290,102 | 9/1981 | Levy et al. | 364/200 |

*Primary Examiner*—James D. Thomas
*Assistant Examiner*—David L. Clark

*Attorney, Agent, or Firm*—George Grayson; John S. Solakian

[57] ABSTRACT

Computer control memory apparatus is disclosed wherein the microinstructions may selectively have a variable bit length. A main control memory stores microinstructions having a basic length and they are read out and stored in a microinstruction register. Microinstruction prefixes are obtained from more than one source and are selectively added to the basic length microinstruction in the microinstruction register to create longer microinstructions, as needed, for controlling the operation of the computer. The microinstruction prefixes may be obtained from a secondary control memory that is addressed at the same time as the main control memory, or may be obtained from a field of N bits which is a part of a previous microinstruction read out of the main control memory and saved in an expansion register, or may be all zeroes when it is not desired to expand a microinstruction of basic length read out of the main control memory. All such microinstruction prefixes are connected via a multiplexer from their source to the portion of the microinstruction register used for prefixing them to the basic length microinstructions. In the event an interrupt occurs to obtain a higher priority string of microinstructions, the multiplexer is prevented from connecting the sources of microinstruction prefixes to the microinstruction register until the interrupt is ended.

1 Claim, 3 Drawing Figures

COMPUTER CONTROL MEMORY APPARATUS PROVIDING VARIABLE MICROINSTRUCTION LENGTH

BACKGROUND OF THE INVENTION

1. Field of the Invention

The present invention relates to the control memory organization in a microprogrammed data processing system.

2. Description of the Prior Art

A microprogrammed data processing system performs each program instruction by executing a microprogram, that is, a sequence of microinstructions stored in a control memory. Each microinstruction is executed in a machine cycle during which it generates signals or microcommands controlling the switching on/off of logical gates, the loading of machine registers and so on, that is, the operations of the logic elements which constitute the data processing system.

Each program instruction to be performed requires the independent control of a certain number of logic elements in sequence in order to allow the data processing system to execute the instruction. The microinstruction capability to independently control the logic elements of the system depends on the number of bits which constitute the microinstruction, that is, on the length of the microinstruction. The greater the length of the microinstruction, the greater the number of logic elements which must be controlled. Within some limits, the design may reduce to a minimum the length of the microinstructions (serial development of the instructions) or to increase the length of the microinstruction (parallel development of the instructions).

The serial development of the instructions involves the use of control memories with reduced word length and a smaller number of total bits. It therefore has the advantage of using less expensive memories, but also the disadvantages of increasing the instruction execution time and of deteriorating the system performance.

The parallel development of the instructions reduces to a minimum the instruction execution time, but it requires a longer word length of the control memory and an increased number of related circuits. This requires a greater memory capacity which is more expensive.

In relation to these aspects and to the fact that the several instructions have different requirements as to sequential operations to be executed and logic elements to be controlled, as well as different frequency of use, it is convenient to have control systems with a variable word length. In such a way, even though the total control memory capacity is limited, it is possible to use the longer word length for those program instructions which are frequently used and/or require the control of a large number of logic elements.

Several solutions have been proposed to achieve this result. In one prior art microprogrammed control system a main control memory with N addressable locations is coupled in parallel to a secondary control memory with M (M<N) addressable locations. The two memories, for addresses less than M, are addressed in parallel and supply together a microinstruction of word length equal to the sum of the word length of the two memories. For addresses greater than M, only the main control memory is addressed providing microinstructions of length equal of its word length.

This solution has the disadvantage of limiting the possibility of expansion of the microinstructions to a determinate set of possible addresses of control memory and imposes a strict limit as to the allocation of the microprograms. In fact, all the microprograms including microinstructions longer than the word length of the main control memory must be stored into a prefixed memory zone; alternatively, the access to such microinstructions can be obtained by means of jump microinstructions stored in another memory zone, but this involves an increase of the memory capacity and a deterioration of performance.

U.S. Pat. No. 4,251,862 entitled "Control Store Organization in a Microprogrammed Data Processing System" describes a microprogrammed control system wherein a main control memory with N addressable locations is coupled to a secondary control memory with M (M<N) addressable locations. A microinstruction read out from the main memory may specify through a suitable bit field representative of an address of the secondary memory and a key bit that the successive microinstruction must be expanded.

In this case, besides the addressing of the main memory for the reading out of the successive microinstructions, the secondary memory is addressed for reading out a binary code representative of the microinstruction expansion. In this way, a longer microinstruction is obtained to the detriment of a certain reduction in length of the previous microinstruction.

This solution has the advantage of allowing the microinstruction expansion in any memory location, but it presents other disadvantages, the most serious of which is that the system is incompatible with the requirement present in the control systems of interrupting the execution of a microprogram for executing a higher priority microprogram. In fact in data processing systems, it is generally provided that a program for performing an internal calculation or a program for processing a slow peripheral unit service may be interrupted at any time for the execution of operations required by a high speed peripheral unit, for example, a disk unit. The interruption is generally acknowledged during a machine cycle, that is, a microinstruction cycle.

It may occur that, during the execution of a microinstruction recalling an expansion code for the successive microinstruction, a microprogram interruption takes place. In that case, the microinstruction executed immediately afterwards is the first microinstruction of the interrupting microprogram and the expansion code is erroneously coupled to it.

Another disadvantage is present if the system has to be modified, that is, constituted at least partially by read/write memories. In such a case, it is necessary that both the main memory and the secondary one be read/write memories, otherwise the expansion code cannot be modified. This involves the necessity of using logical write control circuits for both memories with the result that the circuital complications and the cost increase.

The above disadvantages are overcome by the control memory organization of the present invention which permits variable length microinstructions able to fulfil different operative requirements which nevertheless have to be consistent with the possiblity of microprogram interruption.

OBJECTS OF THE INVENTION

It is an object of the invention to have a data processing system with improved throughput.

It is another object of the invention to provide a control memory organization in the data processing system for improved throughput.

It is yet another object of the invention to provide the control memory organization with a variable word length for improved throughput.

It is still another object of the invention to provide the control memory organization to provide for interruption by higher priority microprograms without loss of throughput.

SUMMARY OF THE INVENTION

The control memory is organized in such a manner as to provide a large word length for those microinstructions that are frequently used and a smaller word length for those microinstruction that are not frequently used. The larger word length microinstructions are stored in a predetermined range of control memory addresses.

A control memory subsystem of a microprogrammed data processing system includes a 32-bit word length main control memory and a 16-bit word length secondary control memory for storing microinstructions. The secondary memory has fewer address locations than the main control memory.

Those frequently used microinstructions have word lengths equal to the sum of the word length of the main and secondary control memories or 48 bits. The infrequently used microinstructions are stored in the main control memory and have a 32-bit word length of an address location in the main control memory.

The microinstruction portion read from the main control memory is stored in an ROR register and the microinstruction portion read from the secondary control memory is stored in an RORA register.

An 8-bit destination register is coupled to the main control memory to store the constant field of certain microinstructions read out of the main control store. These microinstructions result in a microprogrammed signal MC1 being generated which sets a flip-flop 25. If no interrupt is acknowledged, then on a subsequent machine cycle the contents of the destination register is loaded in the RORA register, thereby providing an expanded microinstruction.

If during the execution of the above microinstruction an interrupt is acknowledged, flip-flop 26 is set and the contents of the destination register is not loaded into the RORA register. When the interrupting microprogram is completed, a microinstruction generates a microcommand signal MC2 which resets flip-flop 26. Therefore, when the subsequent microinstruction is loaded into register ROR, the contents of the destination register is loaded into the RORA register and the original microprogram continues to be executed.

The organization of the invention finds a further advantageous employment in control systems wherein at least a portion of the control memory is of a read/write type; in such a case, it permits the modification of the microinstructions and the expansion codes of that portion by using write control logic circuits for the control memory.

The organization of the invention may be advantageously used in microprogrammed control systems wherein the microprograms are stored at least in part into the system working memory rather than into the control memory.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 3 is the timing diagram of some timing signals used in the control memory organization of FIG. 2.

DESCRIPTION OF THE PREFERRED EMBODIMENT

Figure 1:
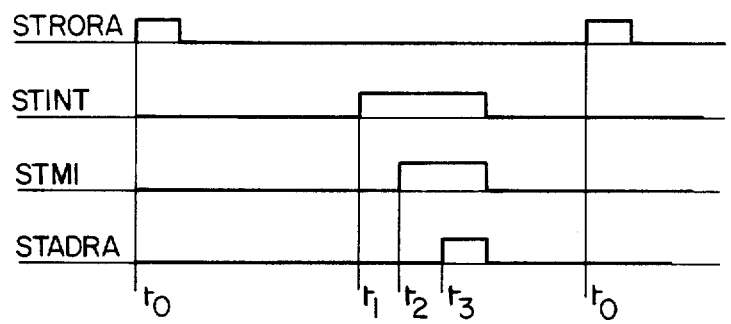
FIG. 1 shows an explanatory prior art example of the format of a microinstruction.

Before describing the control memory organization of the present invention, it is useful in understanding the operation of the invention to very briefly describe prior art microprogrammed data processing systems in which the present invention works.

A microprogram is constituted by an ordered set of microinstructions. The control action performed by a microinstruction is called the execution of the microinstruction.

During each machine cycle, a microinstruction is executed and the one to be executed in the subsequent cycle is fetched. The microprogram structure is generally sequential. In other words, a microprogram is constituted by microinstructions stored in the control memory at consecutive memory addresses. This structure allows the addressing of a microinstruction simply by incrementing the address of the previous one, that is, the microinstruction of address K+1 follows that of address K.

However, it is neither possible nor suitable to follow completely this structural criterion. It is therefore provided that a jump may be achieved from a microinstruction of address K to a microinstruction of address A or K+C. The microinstructions which control such an updating of the address for the fetching of the successive microinstruction are respectively called absolute jump microinstructions and relative jump microinstructions. They define jump address A or the displacement C directly or indirectly (by means of reference to a register containing address A or displacement C).

The jump microinstructions may be of an unconditional or conditional kind. The unconditional jump microinstructions command the jump in any case. The conditional jump microinstructions command the jump only if predetermined conditions are verified inside the data processing system, the conditions being defined by the same conditional jump microinstructions directly or indirectly. The jump microinstructions must also be able to allow for the saving of the address.

In other words, a jump microinstruction of address K can fetch a microinstruction of address A or K+C and, at the same time, save the subsequent address K+1 in a suitable register.

The saving of the address is necessary to return to the sequential flow of a microprogram when a microprogram subroutine recalled by a jump microinstruction has been executed. In such a case, the return microinstruction defines in an indirect way, with reference to the saving register, the absolute return address. Since a subroutine may generally recall a further subroutine, that is, the nesting of subroutines each inside the other being allowed, several saving registers are used.

Such registers constitute a stack into which the several saved addresses are stored, one over the other, and from which the several saved addresses are read out in opposite order as regards the saving one (that is, the last saved address is the first one to be read out).

The use of a register stack also allows the interrupting of a microprogram. In fact, in modern data processing systems it is provided that a running process performed through a microprogram or a sequence of microprograms may be interrupted at any time in order to execute higher priority operations.

For example, some peripheral units such as the disk units without a buffer require that the information exchange with the central unit takes place at prefixed times determined by the disk units. Therefore, the central unit must be able to interrupt the operations in progress in order to start an information exchange process required by the peripheral unit; at the end of such a process, the central unit can resume the interrupted process.

The information exchange requests are presented to the central unit as suitable interruption signals or interruptions. An interruption received during the execution of a microinstruction of address K causes the saving of address K+1 and the generation of an address related to the first microinstruction of an interruption treatment microprogram for serving the interrupting peripheral unit. At the end of the interruption treatment, the interrupted microprogram can therefore resume from address K+1.

FIG. 1 shows as an explanatory example of the bit field format of a prior art microinstruction that aids in understanding the use of bit fields in the operation of the present invention. The microinstructions of 32 bits include an 8-bit field which defines an operation code OP. The remaining 24 bits assume a variable meaning according to the operation code.

A transfer microinstruction may define a source register and a destination register where the contents of the source register must be transferred, a jump microinstruction may define an absolute jump condition and the possible address saving, and an operative microinstruction (addition, subtraction, etc.) may define the registers containing the operands, the destination register of the operation result, etc.

Among the several microinstructions, there is also the constant loading microinstruction shown in FIG. 1. Such a microinstruction includes an operative field OP (bits 0-7), a field ADDR (bits 8-11) defining the register where the constant must be transferred, and a field CONST (bits 24-31) representative of the desired constant. Bits 12-24 are available for other purposes.

The control memory organization of the invention can now be considered.

Figure 2:
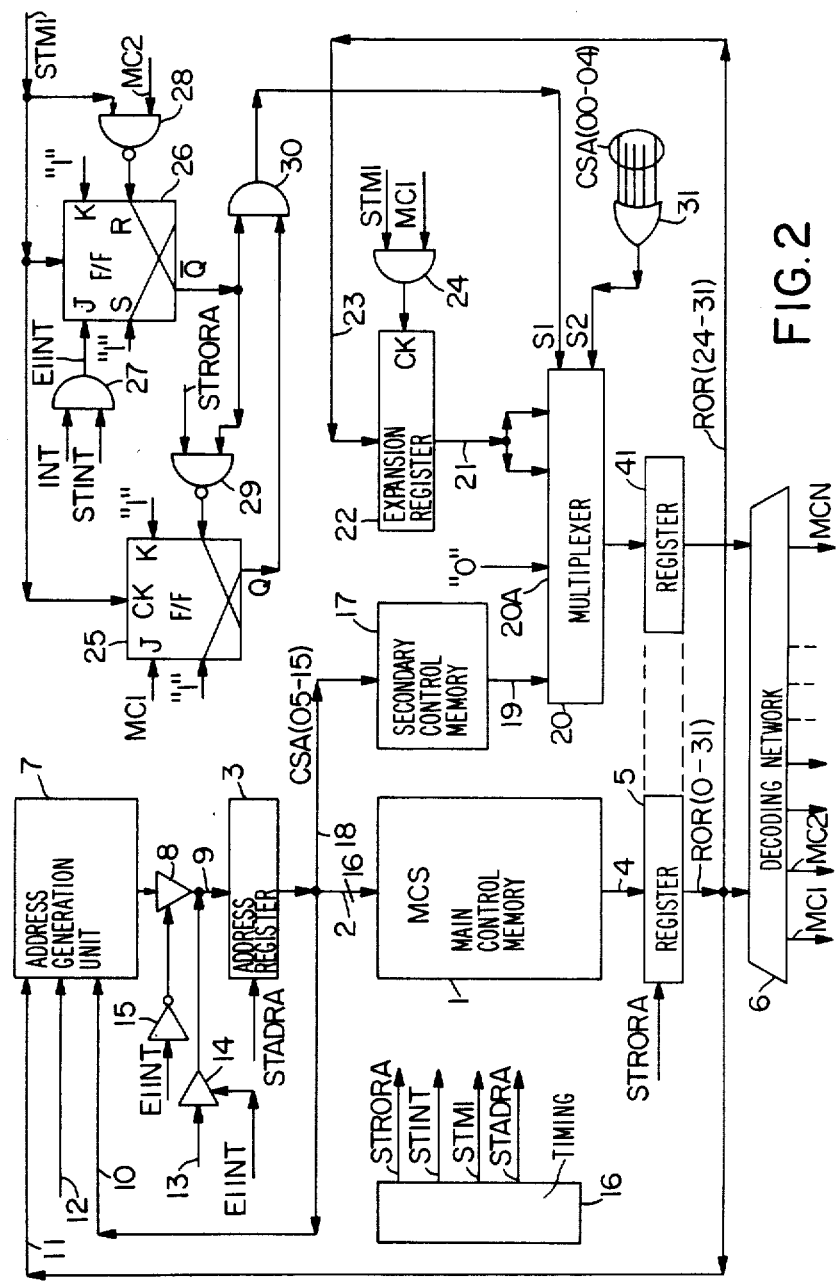
FIG. 2 shows in block diagram form a preferred control memory organization according to the present invention.

Referring to FIG. 2, a main control memory 1, having a word length of 32 bits and a capacity of 64K addressable locations, is addressed through a sixteen wire channel 2 coupled to the outputs of an address register 3. Outputs of memory 1 are coupled through channel 4 to the inputs of a microinstruction register 5, whose outputs ROR 0-31 are coupled to the inputs of a decoding network 6. An address generation unit AGU 7 generates the microinstruction addresses. The outputs of AGU 7 are connected through a tristate gate 8 and a channel 9 to inputs of address register 3.

Address generation unit 7 is of a conventional kind and receives on its inputs: (a) the contents of address register 3 through a channel 10, (b) a portion of the contents of register 5 (for example, bits ROR 15-31) through a channel 11, and (c) the content of one of the several system registers through channel 12. AGU 7 may be designed with AM2930 integrated circuits manufactured by Advanced Micro Devices Inc. Details regarding the AM2930 integrated circuit may be found in "Bipolar Microprocessor Logic And Interface Data Book", copyright 1981, published by and obtainable from Advanced Micro Devices, Inc., 901 Thompson Place, Sunnyvale, Ca., 94086. A detailed description of AGU 7 is unimportant for the purposes of this invention. It is enough to say that AGU 7 comprises a summing network, an incrementing network, multiplexer circuits and a register stack. AGU 7 generates sequential or jump addresses and saves required addresses as previously described. This is made by using the information present on channels 10, 11 and 12, and suitable microcommands received by AGU 7. Such microcommands (not shown) are obtained by the decoding of the microinstruction being executed.

Register ROSPA 3 may also be loaded from an interruption address channel 13 coupled to channel 9 through a tristate gate 14. An interruption signal EIINT, suitably timed, when active enables gate 14 and inhibits gate 8 through a NOT gate 15. The interruption address may be a forced address, that is, an address obtained by suitably connecting the several leads of channel 13 to logical level 1 or 0. Alternatively, the forced address may be read out from a suitable machine register selected by interruption signal EIINT.

Outputs ROR 0-31 of register 5 are coupled to inputs of decoder 6 which decodes the microinstruction stored in such a register in a plurality of microcommands MC1, ... MCN, each controlling together with possible timing signals one or more logic elements of the data processing system. Some of the microcommands are sent, as previously stated, to AGU 7 but they are not shown in FIG. 2 because they are unimportant for the description of this invention.

A timing unit generates cyclical timing signals necessary for the system operation. For the purposes of this invention, it is sufficient to say that timing unit 16 generates the timing signals shown in the diagram of FIG. 3.

At time $t_0$, corresponding to the start of a machine cycle, a signal STRORA is generated. The rising edge of signal STRORA is used for loading the microinstruction read out from control memory 1 into register 5.

At time $t_1$ of the machine cycle, a signal STINT is generated. Signal STINT is used as an enabling signal for the interruptions.

At time $t_2$, subsequent to $t_1$, a signal STMI is generated; it is used as an enabling signal for loading machine registers.

At time $t_3$, a signal STADRA is generated. The rising edge of signal STADRA is used for loading register ROSPA 3. Therefore the machine cycle comprises two phases.

During the first phase, called executive, the microinstruction is loaded into register 5, decoded and executed. Also, the address of the microinstruction to be executed in the subsequent cycle is defined. The possible microprogram interruptions are considered.

During the second phase, which starts with signal STADRA, the execution of the current microinstruction is completed and the reading of the following microinstruction starts with the loading of register 3. In other words, the second phase corresponds to a read cycle of the second memory. A new machine cycle starts at the end of the second phase.

The control memory organization described above is well known in the prior art.

Referring to FIG. 2, the innovative elements are now considered. A secondary control memory 17 having fewer addressable locations than memory 1 (for example, 2K) is coupled in parallel to control memory 1. Memory 17 is addressed through a channel 18 by the less significant bits CSA 05–15 in outputs from register 3. Outputs of memory 17 having a suitable word length (for example, 8 bits) are coupled through a channel 19 to a first input of a multiplexer 20. Outputs of multiplexer 20 are coupled to corresponding inputs of a microinstruction register 41 having the same function as register register 5.

Both register 41 and register 5 are enabled by signal STRORA. Registers 5 and 41, even if shown as separate registers, may constitute one register with a word length equal to the sum of the word lengths of memories 1 and 17.

Outputs of register 41 are coupled to corresponding inputs of decoder 6. The information stored in register 41 provides, when it is suitably decoded by decoder 6, additional microcommands which act together with the ones generated by decoding the content of ROR register 5.

A second input 20A of multiplexer 20 is permanently connected to logical level 0. A third and fourth input of multiplexer 20 are coupled to the outputs of a register 22 through a channel 21. Inputs of register 22 in turn are connected through a channel 23 to suitable outputs of register 5, for example, outputs ROR 24–31. The clock input of expansion register 22 is coupled to the output of an AND gate 24 which receives signal STMI and microcommand MC1 as its inputs.

Whenever the microinstruction in progress is a constant loading microinstruction and defines register 22 as a destination register, MC1 is at logical level 1 and the constant present on channel 23 is loaded into register 22.

The control memory organization is completed by two flip-flops 25 and 26, and by logic gates 27, 28, 29, 30 and 31. J-K flip-flop 25 receives microcommand MC1 on its J input; its K input is permanently connected to a logical level 1. Signal STMI is applied to the clock input CK of flip-flop 25. Flip-flop 25 is set by the rising edge of signal STMI if MC1 is at logical level 1; otherwise, it does not change its state.

J-K flip-flop 26 receives on its J input signal EIINT which is present on the output of AND gate 27, and it receives on its K input a signal permanently at logical level 1. Signal STMI is applied to the clock input CK of flip-flop 26. Flip-flop 26 is set by the rising edge of signal STMI if, at the same time, signal EIINT output from AND gate 27 is at logical level 1, otherwise it does not change its state. AND gate 27 receives as its inputs an interruption signal INT and the timing signal STINT.

The reset input of flip-flop 26 is coupled to the output of NAND gate 28. Whenever a signal at logical level 0 is applied to this reset input R, flip-flop 26 is reset. NAND gate 28 receives as its inputs signal STMI and microcommand MC2. Microcommand MC2 is at logical level 1 when the microinstruction in progress is an interruption end microinstruction, that is, it commands the return to an interrupted microprogram.

Reset input R of flip-flop 25 is coupled to the output of NAND gate 29. NAND gate 29 receives a first input signal STRORA. A second input of NAND gate 29 is coupled to output Q of flip-flop 26.

Multiplexer 20 is controlled by means of two selection inputs S1 and S2. Input S1 is coupled to the output of AND gate 30 whose two inputs are connected to output Q of flip-flop 25 and to output Q of flip-flop 26, respectively. Input S2 is coupled to the output of OR gate 31 which receives on its inputs control memory addressing bits CSA 00–04. When bits CSA 00–04 are all at logical level 0, that is, the control memory address is less than 2K, the output of OR gate 31 is at logical level 0. When S2=S1=0, channel 19 is coupled to the outputs of multiplexer 20. When S2=1 and S1=0, input set 20A is coupled to the outputs of multiplexer 20. When S1=1, channel 21 is coupled to the outputs of multiplexer 20, regardless of the logical level of S2.

The operation of the control memory organization will now be described. When main control memory 1 is addressed with addresses less than 2K, that is, CSA 00–04=0, secondary control memory 17 is also addressed. The information read out from memory 17 is transferred to register 41 through multiplexer 20. In other words for addresses less than 2K, expanded microinstructions are obtained; the word length of these microinstructions is equal to the sum of the word lengths of memories 1 and 17.

When main control memory 1 is addressed with addresses greater than or equal to 2K, that is, at least a bit of CSA 00–04 is equal to 1, an "all zeroes" code is forced into register ROR A 41 through multiplexer 20. In other words for addresses greater than or equal to 2K, microinstructions of normal length are obtained; the word lengths of such microinstructions are equal to the word length of memory 1. However, it is possible to store in control memory 1 at any address K a constant loading microinstruction which commands the loading of a constant into register 22. In such a case when the microinstruction of address K is read out and loaded into register ROR 5, microcommand MC1 is generated. During the execution of such a microinstruction, signal STMI sets flip-flop 25 and the constant defined by the field of bits 24–31 (FIG. 1) of the microinstruction is loaded into register 22. If no interruption is acknowledged during the execution of the constant loading microinstruction, flip-flop 26 remains reset and the output of AND gate 30 is therefore at logical level 1.

At the start of the subsequent cycle, a new microinstruction is loaded on the rising edge of STRORA into register ROR 5 and, at the same time, the information stored into register 22 is transferred into register 41. This provides an expanded microinstruction. The microinstruction expansion is obtained at the expense of the previous microinstruction which must be of constant loading and therefore must use a bit field to define such a constant. At the same time, signal STRORA resets flip-flop 25 through NAND gate 29. The signal present on input S1 of multiplexer 20 falls to logical level 0 with a time delay determined by the rising edge of signal STRORA along logic chain NAND gate 29, flip-flop 25 and AND gate 30.

If during the execution of the microinstruction of address K (constant loading microinstruction) an interruption is acknowledged, flip-flop 25 is set along with flip-flop 26. In such a case, S1 remains at logical level 0 and the contents of register 22 is not transferred to register 41 with the subsequent rising edge of signal STRORA.

During all the machine cycles relating to the development of the interruption microprogram, flip-flops 25 and 26 remain set. The last microinstruction of the interruption microprogram is a microinstruction of interruption end and calls for a return to the interrupted microprogram. The microinstruction generates microcommand MC2 which resets flip-flop 26. Therefore when the subsequent microinstruction is loaded into register ROR 5 with signal STRORA, the contents of register 22 is transferred to register 41 and the interrupted microprogram may be resumed without information loss. It is to be noted that, according to the described control memory organization, an interruption microprogram cannot use microinstructions expanded by means of register 22 because this may already contain the information necessary for executing an interrupted microprogram. However, such restriction is negligible since the interrupted microprogram may be stored in control memory 1 at addresses less than 2K and therefore the microinstruction expansion may be obtained by means of control memory 17.

The control memory organization of the invention has many advantages. With regard to a range of main control memory addresses, the microinstructions can be expanded by using a secondary control memory with reduced capacity addressed in parallel with the main memory. Possible microprogram interruptions do not affect the correct execution of the control operations. The microinstruction expansion obtained through an additional control memory may be advantageously used to execute fast operations requiring the parallel control of many system logic elements and/or having a high frequency of use, as for example in operations of instruction interpretation or interruption treatment.

With respect to all the memory capacity, the microinstructions can be expanded by using a field of the previous microinstruction as an expansion code for a subsequent microinstruction. This involves that the expanded microinstruction be preceded by a microinstruction which generally has the only task of loading a constant into register 22 and therefore cannot be used for other purposes. This causes a slowing of the operations performed by the system. Therefore, such a microinstruction expansion may be advantageously used for executing diagnostic operations requiring the parallel control of many electronic devices which have a low frequency of use. In this case, possible microprogram interruptions do not affect the correct execution of the control operations.

It is clear that the above description only relates to a preferred embodiment of the invention and that several changes may be made without departing from the scope of the invention. Particularly, secondary memory 17 may be coupled to any address range of main memory 1 rather than to the address range of lower order. In such a case, OR gate 31 must be replaced by an address decoder.

What we claim is:

1. Apparatus for providing a sequence of variable microinstructions having a first priority to a digital computer for controlling operations in said digital computer, wherein each variable microinstruction is made up of two microinstructions stored in and read from a memory in said computer, and execution of said sequence of variable microinstructions to control operations in the computer may be interrupted by an interruption signal generated within the computer in order that a higher priority sequence of microinstructions input to said computer from said memory may be executed before the computer completes execution of the first priority sequence of microinstructions, said apparatus comprising:

a main control memory with addressable storage locations, each location containing a first microinstruction, said main control memory being provided with an input for addresses, and an output for first microinstructions read out of said main control memory in response to addresses on its input;

a secondary control memory with addressable storage locations, each location containing a second microinstruction, said secondary control memory being provided with an input for addresses, and an output for second microinstructions read out of said secondary control memory in response to addresses on its input;

means for jointly addressing said main and said secondary control memories to read said first and said second microinstructions therefrom, said addressing means being connected to said input of both said memories;

a microinstruction register having a first and a second storage portion, said first storage portion being connected to said output of said main memory and receiving a first microinstruction therefrom; and said second storage portion receiving said second microinstruction read out of said secondary control memory, or a third microinstruction read out of an expansion register, or all zeroes, and the microinstructions or zeroes in said first and said second storage portions making up a variable microinstruction having a bit length equal to the sum of the bit lengths of the microinstructions or zeroes stored in said first and said second storage portions, said variable microinstruction for controlling operations in the computer, means for decoding connected to said microinstruction register for decoding said variable microinstruction received therein, said expansion register connected to said decoding means and said first storage portion and responsive to a decoded variable microinstruction to store a portion of said first storage portion, said expansion register also storing a microinstruction which is said third microinstruction;

multiplexing means having a plurality of inputs to which are applied said second microinstructions stored in said secondary control memory, said third microinstructions stored in said expansion register, or all zeroes, and an output which is selectively connected to one of the plurality of inputs for outputting ones of the microinstructions or all zeroes from the inputs connected thereto to be stored in said second storage portion of said microinstruction register, a first one of said multiplexing means inputs being connected to said output of said secondary control memory, a second one of said multiplexing means inputs being connected to the output of said expansion register, and a third one of said multiplexing means inputs having a binary number of all zeroes input thereto, said multiplexing means output being connected to said second storage portion of said microinstruction register, and said multiplexing means having a first and a second control input to which are respectively applied first and second selection signals to control said multiplexing means;

a first logical circuit having input thereto a portion of a microinstruction address from said addressing means and in response thereto generating said first selection signal which is applied to said first control input of said multiplexing means, said first selection signal being used to enable said multiplexing means to transfer a microinstruction or all zeroes from one of said three inputs of said multiplexer to said second storage portion of said microinstruction register; and second logical circuits connected to said decoding means and set by said interruption signal and reset by a decoded variable microinstruction of said first priority sequence of microinstructions, said second logical circuits being in their reset state generating said second selection signal which is applied to said second control input of said multiplexing means and enables said multiplexing means to connect one of the second or third microinstructions or all zeroes on said three inputs of said multiplexer to said second storage portion of said microinstruction register.

* * * * *